(12) United States Patent
Yasuda

(10) Patent No.: US 11,561,908 B2
(45) Date of Patent: Jan. 24, 2023

(54) ELECTRONIC DEVICE, PROCESSING PROXY REQUESTING METHOD OF ELECTRONIC DEVICE, AND INFORMATION PROCESSING SYSTEM

(71) Applicant: SONY SEMICONDUCTOR SOLUTIONS CORPORATION, Kanagawa (JP)

(72) Inventor: Norio Yasuda, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 610 days.

(21) Appl. No.: 16/480,185

(22) PCT Filed: Nov. 7, 2017

(86) PCT No.: PCT/JP2017/040038
§ 371 (c)(1),
(2) Date: Jul. 23, 2019

(87) PCT Pub. No.: WO2018/150649
PCT Pub. Date: Aug. 23, 2018

(65) Prior Publication Data
US 2020/0004698 A1    Jan. 2, 2020

(30) Foreign Application Priority Data
Feb. 14, 2017    (JP) .............................. JP2017-024847

(51) Int. Cl.
*G06F 13/12* (2006.01)
*G06F 3/0484* (2022.01)
(Continued)

(52) U.S. Cl.
CPC .......... *G06F 13/128* (2013.01); *G06F 3/0484* (2013.01); *G06F 13/385* (2013.01); *H04L 41/08* (2013.01); *H04L 67/125* (2013.01)

(58) Field of Classification Search
CPC ....... H04L 67/10; H04L 67/12; H04L 67/125; H04L 63/0428; H04L 41/08; G06F 13/385; G06F 13/128; G06F 3/0484
See application file for complete search history.

(56) References Cited

U.S. PATENT DOCUMENTS

2006/0253592 A1    11/2006    Oashi et al.
2009/0181640 A1*   7/2009    Jones ...................... G08B 25/08
                                                                455/404.2
(Continued)

FOREIGN PATENT DOCUMENTS

CN           1806465 A      7/2006
CN         103931201 A      7/2014
(Continued)

OTHER PUBLICATIONS

International Search Report and Written Opinion of PCT Application No. PCT/JP2017/040038, dated Jan. 23, 2018, 07 pages of ISRWO.

*Primary Examiner* — Jungwon Chang
(74) *Attorney, Agent, or Firm* — Chip Law Group

(57) ABSTRACT

A system is dynamically configured according to a state of a device connected to a network. An electronic device includes a device information management unit, an acquisition unit, a detection unit, and a device cooperative processing unit. The device information management unit manages device information related to a different device connected through a network. An acquisition unit acquires surrounding information. A detection unit detects generation of a specific event on the basis of the acquired surrounding information. In a case where a function necessary for processing the surrounding information in response to detection of the specific event is not included in itself, the device cooperative processing unit selects a device including the
(Continued)

function from the different device on the basis of the device information and gives a request for proxy of the processing thereto through the network.

11 Claims, 18 Drawing Sheets

(51) Int. Cl.
    *G06F 13/38*     (2006.01)
    *H04L 41/08*     (2022.01)
    *H04L 67/125*     (2022.01)

(56) References Cited

U.S. PATENT DOCUMENTS

| | | | | |
|---|---|---|---|---|
| 2013/0307971 | A1* | 11/2013 | Ganesan | H04N 21/21805 348/143 |
| 2013/0329052 | A1* | 12/2013 | Chew | G08G 5/065 348/159 |
| 2014/0304758 | A1 | 10/2014 | Tanaka et al. | |
| 2015/0339911 | A1* | 11/2015 | Coyne | H04N 7/181 340/517 |
| 2017/0249626 | A1* | 8/2017 | Marlatt | G08G 1/149 |

FOREIGN PATENT DOCUMENTS

| | | |
|---|---|---|
| JP | 2006-295396 A | 10/2006 |
| JP | 2016-045964 A | 4/2016 |
| WO | 2005/072002 A1 | 8/2005 |
| WO | 2013/061366 A1 | 5/2013 |
| WO | 2013/145530 A1 | 10/2013 |

* cited by examiner

FIG. 3

| CLASSIFICATION | ITEM | ACCEPTANCE DETERMINATION | RESPONSE |
|---|---|---|---|
| UNIQUE INFORMATION | MAC ADDRESS |  | ○ |
|  | INSTALLATION POSITION |  | ○ |
| FUNCTIONAL INFORMATION | SUBSTITUTABLE FUNCTION | ○ | ○ |
| EVENT INFORMATION | DETECTION INTERVAL |  | ○ |
| POWER-SUPPLY INFORMATION | REMAINING AMOUNT OF BATTERY | ○ | ○ |
|  | THRESHOLD | ○ |  |
| COMMUNICATION INFORMATION | TRANSMISSION STATE | ○ |  |
|  | TRANSMISSION BUFFER STATE | ○ |  |

FIG. 10

DEVICE: C1

| INDEX | FORM | TIME | REQUEST DEVICE | CONTENTS |
|---|---|---|---|---|
| C2_XXXX | MOVING IMAGE | START=2017/01/01 10:15<br>END=2017/01/01 10:18 | C2 | ¥SD_Media¥rec¥<br>aaa¥bbb¥ccc.data |
| ⋮ | ⋮ | ⋮ | ⋮ | ⋮ |

DEVICE: C2

| INDEX | FORM | TIME | REQUEST DEVICE | CONTENTS |
|---|---|---|---|---|
| C2_XXXX | MOVING IMAGE | START=2017/01/01 10:15<br>END=2017/01/01 10:18 | C1 | INTRUDER DETECTION |
| ⋮ | ⋮ | ⋮ | ⋮ | ⋮ |

ELECTRONIC DEVICE, PROCESSING PROXY REQUESTING METHOD OF ELECTRONIC DEVICE, AND INFORMATION PROCESSING SYSTEM

CROSS REFERENCE TO RELATED APPLICATIONS

This application is a U.S. National Phase of International Patent Application No. PCT/JP2017/040038 filed on Nov. 7, 2017, which claims priority benefit of Japanese Patent Application No. JP 2017-024847 filed in the Japan Patent Office on Feb. 14, 2017. Each of the above-referenced applications is hereby incorporated herein by reference in its entirety.

TECHNICAL FIELD

The present technology relates to an electronic device. More specifically, there is a relation to an information processing system including a plurality of electronic devices connected through a network, a processing method therein, and a program for causing a computer to execute the method.

BACKGROUND ART

Along with a spread of the Internet, a system comes to include a plurality of devices connected through the Internet. For example, a system in which device configuration is performed by a system server on the basis of a user input has been proposed in a system of so-called the Internet of things (IoT) (see, for example, Patent Document 1).

CITATION LIST

Patent Document

Patent Document 1: Japanese Patent Application Laid-Open No. 2016-045964

SUMMARY OF THE INVENTION

Problems to be Solved by the Invention

In the above-described conventional technology, configuration is performed automatically in a system in which a plurality of devices is connected. However, since setting is performed by central control by a system server on the basis of a user input in this conventional technology, the system server needs to change the setting according to a connection state of each device. Therefore, there is a problem that this is not practical in such a system that can be easily influenced by a connection state of a network.

The present technology is provided in view of such a situation and is to dynamically configure a system according to a state of a device connected to a network.

Solutions to Problems

The present technology is provided to solve the above problem, and a first aspect thereof is an electronic device including: a device information management unit configured to manage device information related to a different device connected through a network; an acquisition unit configured to acquire surrounding information, a detection unit configured to detect generation of a specific event on the basis of the acquired surrounding information; and a device cooperative processing unit configured to select, in a case where a function necessary for processing the surrounding information in response to detection of the specific event is not included in itself, a device including the function from the different device on the basis of the device information and to give a request for proxy of the processing thereto through the network, an information processing system using the electronic device, and a processing proxy requesting method of the electronic device. With this arrangement, an action of giving a request for proxy processing to a different device on the basis of device information managed in an own device is performed.

Furthermore, in this first aspect, the device information management unit may further manage request contents of when a request for proxy is given to the different device. With this arrangement, an action of causing recognition of contents of proxy processing requested to a different device is performed.

Furthermore, in this first aspect, in a case where an error is generated in the device to which the request for proxy is given, the device cooperative processing unit may select a different device including the function among the different devices on the basis of the device information and give a request for proxy of the processing through the network. With this arrangement, an action of changing a device in a request destination in response to generation of an error is performed.

Furthermore, in this first aspect, the device information management unit may further manage device information related to the own device, and the device cooperative processing unit may determine, in a case where a request for proxy of processing is received from a different device, whether or not the requested proxy of processing is possible on the basis of the device information related to the own device. With this arrangement, an action of determining whether or not to accept proxy processing requested by a different device is performed. Furthermore, in this case, the device information management unit may further manage request contents of when a request for processing proxy is received from the different device. With this arrangement, an action of causing recognition of contents of proxy processing requested from a different device is performed.

Furthermore, in this first aspect, the device information may include information of a list of functions that can be provided, as proxy processing, to a different device by each device. With this arrangement, an action of using this for determination whether or not to give a request for proxy processing is performed. Note that the above functions that can be provided may vary dynamically according to a processing load of the device.

Furthermore, in this first aspect, the acquisition unit may image and acquire image data as the surrounding information, or may measure and acquire at least one of sound, temperature, humidity, pressure, acceleration, magnetism, or an amount of radiation as the surrounding information.

Effects of the Invention

According to the present technology, a great effect that it is possible to dynamically configure a system according to a state of a device connected to a network can be acquired. Note that an effect described herein is not necessarily limited and may be any of the effects described in the present disclosure.

BRIEF DESCRIPTION OF DRAWINGS

FIG. 3 is a view illustrating an example of an item of device information in the embodiment of the present technology.

FIG. 10 is a view illustrating a detailed example of management information in the second embodiment of the present technology.

MODE FOR CARRYING OUT THE INVENTION

In the following, a mode for carrying out the present technology (hereinafter, referred to as embodiment) will be described. A description will be made in the following order.

1. First embodiment (Example of monitoring system)
2. Second embodiment (Use case of processing proxy)
3. Third embodiment (Example of using beacon)
4. Fourth embodiment (Example of proxy image analysis)
5. Fifth embodiment (Example of application to general sensor)
6. Sixth embodiment (Example of using state of device as index)

1. First Embodiment

[Configuration of Monitoring System]

Figure 1:
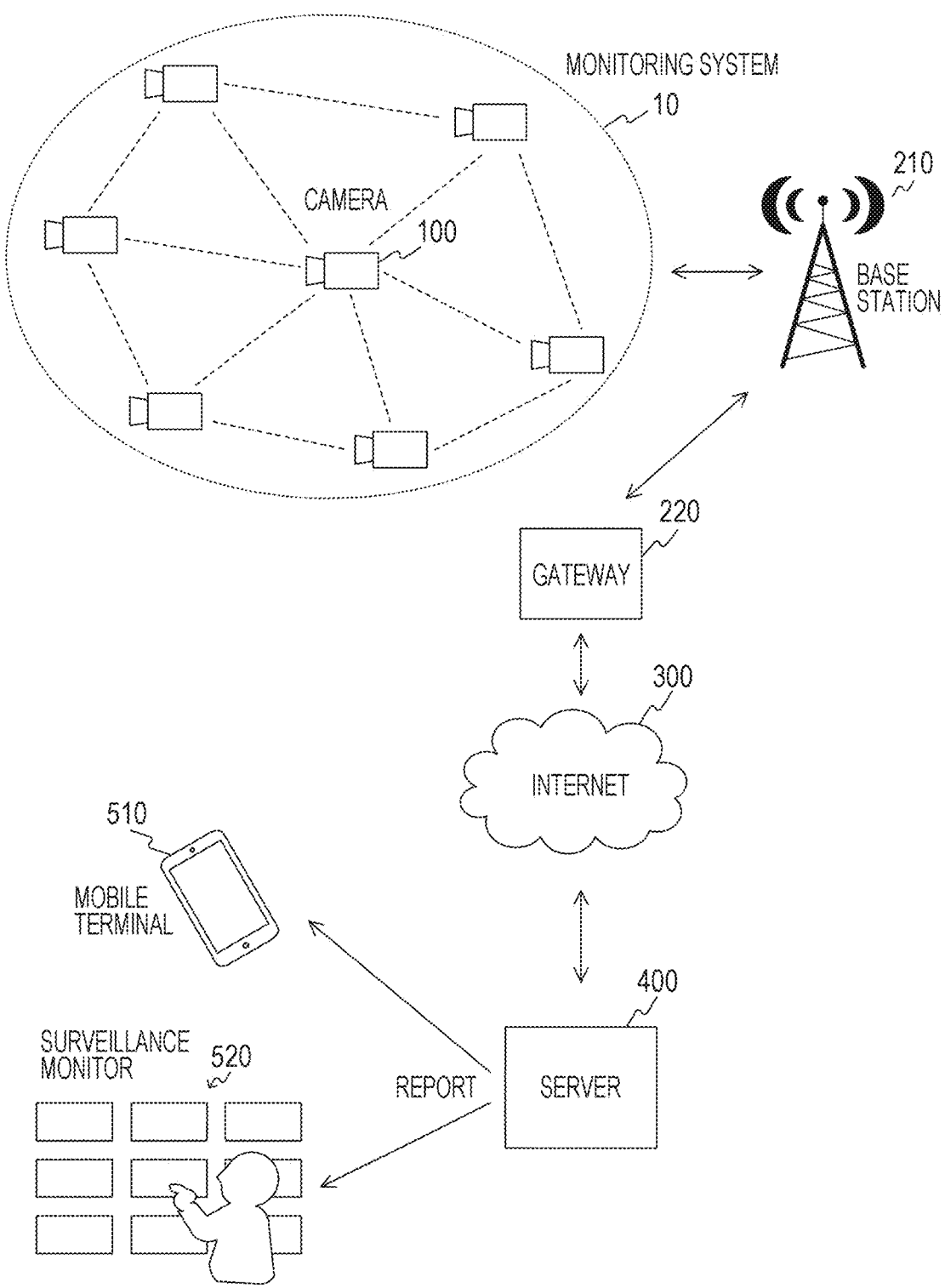
FIG. 1 is a view illustrating a configuration example of a whole monitoring system in an embodiment of the present technology.

FIG. 1 is a view illustrating a configuration example of a whole monitoring system in an embodiment of the present technology. This monitoring system includes a plurality of cameras 100 connected to each other through a network of short-distance communication. It becomes possible to monitor a wide region by using the plurality of cameras 100. Each of the plurality of cameras 100 performs cooperative processing with a different camera 100 by mutually giving a request for proxy of processing to a different device or performing proxy of processing requested by a different device.

Each camera 100 acquires information of the surrounding thereof and performs transmission to a server 400 through a base station 210 or the like. Here, for example, Bluetooth (registered trademark), Zigbee (registered trademark), Wi-Fi (registered trademark), or the like is assumed as a network of short-distance communication.

Furthermore, each camera 100 is connected to the base station 210 by long-distance communication, and communicates with the server 400 from a gateway 220 through the Internet 300. Here, for example, mobile communication such as long term evolution (LTE) is assumed as a communication method of long-distance communication.

The server 400 receives the surrounding information acquired by the camera 100, and reports the surrounding information to a mobile terminal 510 carried by a user, a surveillance monitor 520, or the like.

Figure 2:
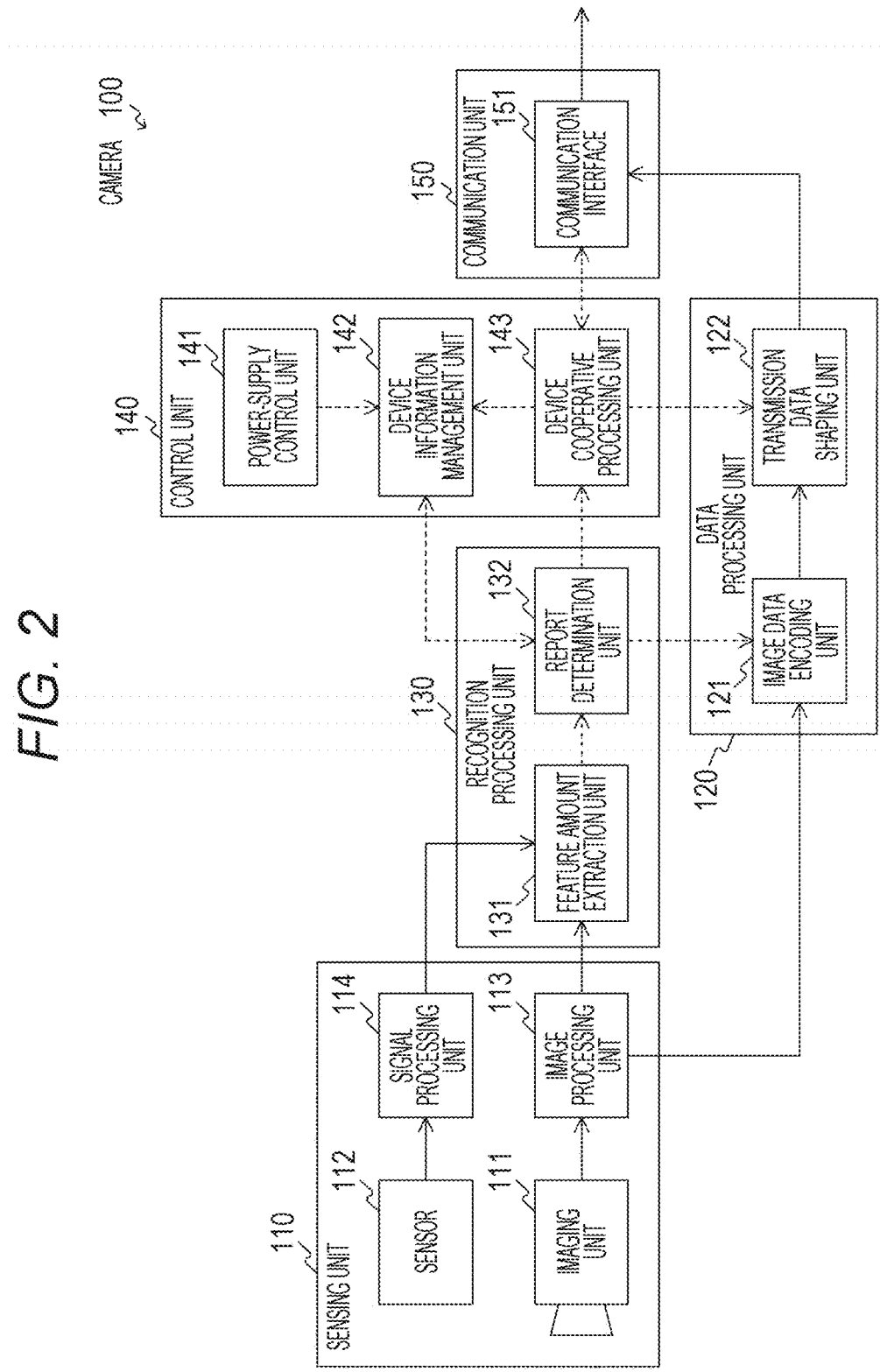
FIG. 2 is a view illustrating an example of a configuration of a camera 100 in the embodiment of the present technology.

FIG. 2 is a view illustrating an example of a configuration of a camera 100 in the embodiment of the present technology. This camera 100 includes a sensing unit 110, a data processing unit 120, a recognition processing unit 130, a control unit 140, and a communication unit 150.

The sensing unit 110 is to acquire image data or various physical amounts, and includes an imaging unit 111, a sensor 112, an image processing unit 113, and a signal processing unit 114.

The imaging unit 111 is to image a predetermined monitoring range and to acquire image data acquired as a result of the imaging. This image data acquired by the imaging unit 111 is an example of the above-described surrounding information. Note that this image data is moving image data, or still image data imaged in a predetermined cycle.

The image processing unit 113 is to perform, with respect to the image data acquired by the imaging unit 111, image processing such as demosaic, a gradation correction, a color tone correction, a noise removal, a distortion correction, or a size correction as preprocessing of recognition processing.

The sensor 112 is to measure each of physical amounts such as sound, temperature, humidity, pressure, acceleration, magnetism, and an amount of radiation and to acquire sensor information. Furthermore, the sensor 112 may acquire sensor information by emitting an electromagnetic wave or the like and detecting a state of an irradiated range on the basis of a reflection wave thereof. This sensor information acquired by the sensor 112 is an example of the above-described surrounding information.

The signal processing unit 114 is to perform signal processing such as a noise removal or a frequency analysis as preprocessing of recognition processing after performing analog to digital (AD) conversion of the sensor information acquired by the sensor 112.

The recognition processing unit 130 is to detect a specific event on the basis of image data or the like, and includes a feature amount extraction unit 131 and a report determination unit 132. In this monitoring system, for example, what becomes an object of monitoring such as intrusion of a suspicious person or an unidentified object, or occurrence of fire is assumed as a specific event. Furthermore, it is assumed to detect a specific event on the basis of image data or the like in this example. However, an explicit request such as an operation instruction from a different camera 100 or the like may be detected as a specific event.

The feature amount extraction unit 131 is to extract a feature amount that becomes necessary for detection of a specific event from the preprocessed image data or sensor information. The report determination unit 132 is to determine whether or not a specific event is generated on the basis of a change in the feature amount supplied by the feature amount extraction unit 131. For example, an unspecified object detected as a moving body, a specified person registered in a database, or the like is considered as a specific event detected from the image data. Furthermore, for example, a case where a surrounding sound exceeds a predetermined level, a surrounding temperature exceeds a predetermined temperature, or the like is considered as a specific event detected from the sensor information.

The data processing unit 120 is to perform data processing such as encoding of image data or addition of meta information, and includes an image data encoding unit 121 and a transmission data shaping unit 122.

The image data encoding unit 121 is to encode the image data supplied by the image processing unit 113 according to a predetermined encoding system. This image data encoding unit 121 captures the image data from the image processing unit 113 and performs encoding thereof in a case of being notified of generation of a specific event by the report determination unit 132.

By adding information indicating the specific event detected by the report determination unit 132 or meta information such as detection time to the image data encoded by the image data encoding unit 121, the transmission data shaping unit 122 performs shaping as transmission data.

The control unit 140 is to perform various kinds of control, and includes a power-supply control unit 141, a device information management unit 142, and a device cooperative processing unit 143.

The power-supply control unit 141 is to perform charging control of a battery (not illustrated). This power-supply control unit 141 monitors a state of the battery and notifies the device information management unit 142 of a remaining amount thereof, for example.

The device information management unit 142 is to manage device information of each of a plurality of cameras 100. Furthermore, the device information management unit 142 also holds management information related to various files acquired as a result of cooperative processing. In addition to a property of a file acquired by requested proxy processing, request contents thereof are also stored as this management information. These device information and management information are suppled in response to a request from the device cooperative processing unit 143. Detailed contents of the device information and the management information will be described later.

The device cooperative processing unit 143 is to determine whether or not to give a request for proxy of processing to a different camera 100 on the basis of the device information supplied by the device information management unit 142 and to control cooperative processing with the different camera 100.

The communication unit 150 is to perform communication with the outside and includes a communication interface 151. The communication interface 151 performs short-distance communication or long-distance communication according to an instruction from the device cooperative processing unit 143. Furthermore, this communication interface 151 includes a transmission buffer to hold transmission data. Note that a communication system depends on a function included in a camera 100. There may be a model of performing only short-distance communication, and a model including communication functions of both of short-distance communication and long-distance communication.

[Device Information]

FIG. 3 is a view illustrating an example of an item of device information in the embodiment of the present technology. The device information management unit 142 manages device information in association with each camera 100. As this device information, not only device information related to a different camera 100 but also device information related to itself can be managed. The device information managed in the device information management unit 142 is classified, for example, into unique information, functional information, event information, power-supply information, and communication information.

The unique information is information unique for a camera 100, and a MAC address and an installation position correspond thereto, for example. The functional information is information related to a function included in the camera 100 and, for example, a substitutional function corresponds thereto. The event information is information related to an event handled by the camera 100 and, for example, a detection interval corresponds thereto. The power-supply information is information related to a power-supply of the camera 100 and, for example, a remaining amount of a battery and a threshold correspond thereto. The communication information is information related to a communication function of the camera 100 and, for example, a transmission state and a transmission buffer state correspond thereto.

The MAC address is a physical address to uniquely identify the camera 100. As long as the camera 100 can be uniquely identified in a network, information other than the MAC address may be used.

The installation position is information indicating a position where the camera 100 is installed. For example, coordinate information measured by a global positioning system (GPS) can be used as this installation position. However, it is assumed that a worker performs setting in installation of a camera in an interior environment or the like in which measuring by the GPS is not possible. Furthermore, this installation position is not necessarily from the GPS and may be relative coordinates from a certain reference position.

The substitutional function is information of a list of functions that can be provided as proxy processing for a different camera 100. What is provided as this substitutional function can be changed according to a condition of the camera 100. For example, a change may be made dynamically according to a processing load of the camera 100.

The detection interval is information indicating an average interval in which a specific event is detected in the camera 100. Note that a detailed optimal value of an averaging period (number of pieces of data) varies depending on an observed object.

The remaining amount of a battery is information indicating a remaining amount of a battery of the camera 100 in percentage, for example. The threshold is a threshold for dividing a level of the remaining amount of a battery. For example, two thresholds are used in a case where the remaining amount of a battery is divided into three that are large, middle, and small. However, it is not necessary to perform division into three, and determination can be made according to a use case or a battery characteristic.

The transmission state is information indicating whether or not data transmission with respect to the server 400 is performed by long-distance communication. The transmission buffer state is information indicating the number of pieces of transmission data stored in a transmission buffer.

The substitutional function, the remaining amount of a battery, the threshold, the transmission state, and a transmission buffer state among items of the device information are used for determination whether or not proxy processing requested from a different device is possible. Then, in a case where it is determined that the proxy processing is possible, the MAC address, the installation position, the substitutional function, the detection interval, and the remaining amount of a battery among the items of the device information are transmitted to a request source of the proxy processing. However, all items of the device information may be transmitted to the request source of the proxy processing.

[Application Example in Parking Lot]

Figure 4:
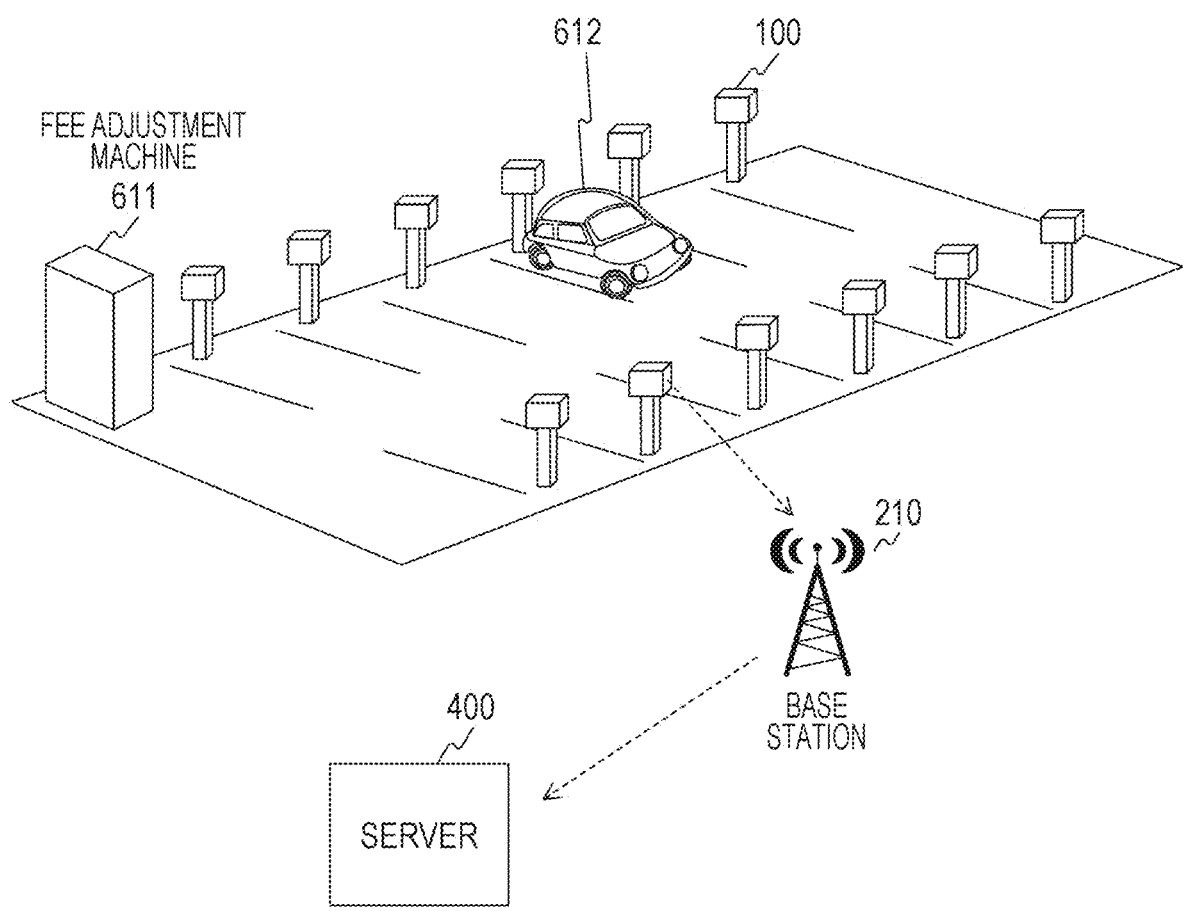
FIG. 4 is a view illustrating an application example of a monitoring system in a parking lot in the embodiment of the present technology.

FIG. 4 is a view illustrating an application example of a monitoring system in a parking lot in the embodiment of the present technology. In this example, a camera 100 is installed for each parking space in the parking lot. Furthermore, a fee adjustment machine 611 to adjust a parking fee is installed in the site.

In a standby state, the cameras 100 perform low-resolution imaging in a power save mode and try moving body detection. If a car enters any of the parking spaces, a camera 100 corresponding to the parking space detects entrance of the car. With this detection as a trigger, the camera 100 becomes a normal power mode, performs high-resolution imaging, and transmits image data of a license plate region to a server 400, for example.

The cameras 100 build a meshed network, and can give a request for transmission of image data or for very imaging to a different camera 100. A camera 100 in a request destination to which camera a request for imaging is given performs imaging and generates image data instead of a camera 100 in a request source. Furthermore, a camera 100 in a request destination to which camera a request for transmission is given transmits the image data to the server 400 through a base station 210 instead of a camera 100 in a request source.

Figure 5:
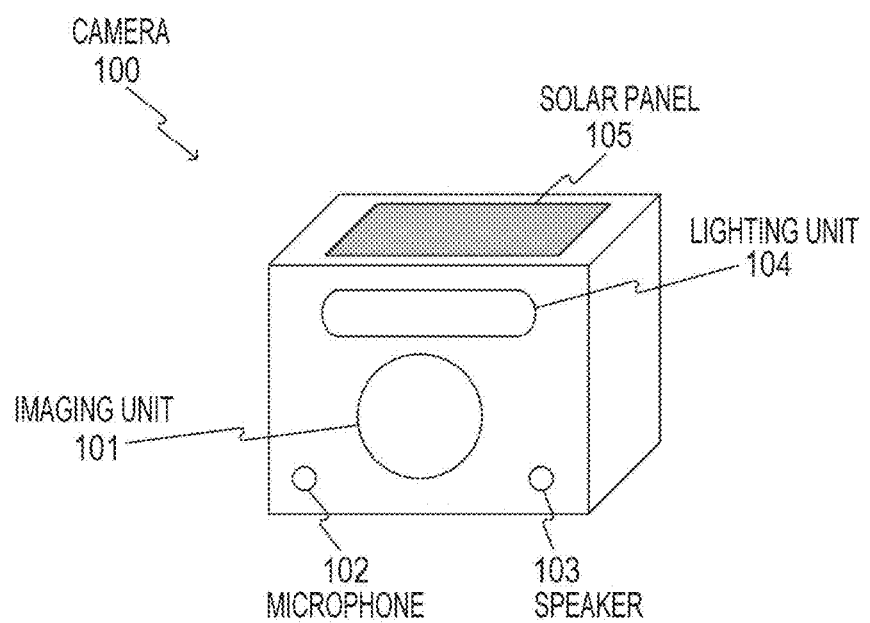
FIG. 5 is a view illustrating an appearance example of a camera 100 in the embodiment of the present technology.

FIG. 5 is a view illustrating an appearance example of a camera 100 in the embodiment of the present technology. This camera 100 includes an imaging unit 101, a microphone 102, a speaker 103, a lighting unit 104, and a solar panel 105.

The imaging unit 101 is to image an image of the surrounding, and includes an optical lens, an imaging element, or the like. This imaging unit 101 preferably has high sensitivity and high image quality. The microphone 102 is to acquire sound of the surrounding. The image imaged by the imaging unit 101 and the sound acquired by the microphone 102 are transmitted to the server 400.

The speaker 103 is a device to output sound. In a case where a trouble is detected, a warning sound can be output from this speaker 103. Furthermore, sound may be output by an operator from the surveillance monitor 520 or the like to the speaker 103 through the server 400.

The lighting unit 104 is a light or the like to illuminate the surrounding. This lighting unit 104 may emit visible light or invisible light in imaging according to brightness of an imaging range. Furthermore, this lighting unit 104 may be automatically turned on when a moving body is detected.

The solar panel 105 is a panel to perform solar power generation. Since the camera 100 is installed in the outside, it is preferable that a use of a battery is controlled by utilization of electric power from this solar panel 105.

[Operation of Monitoring System]

Figure 6:
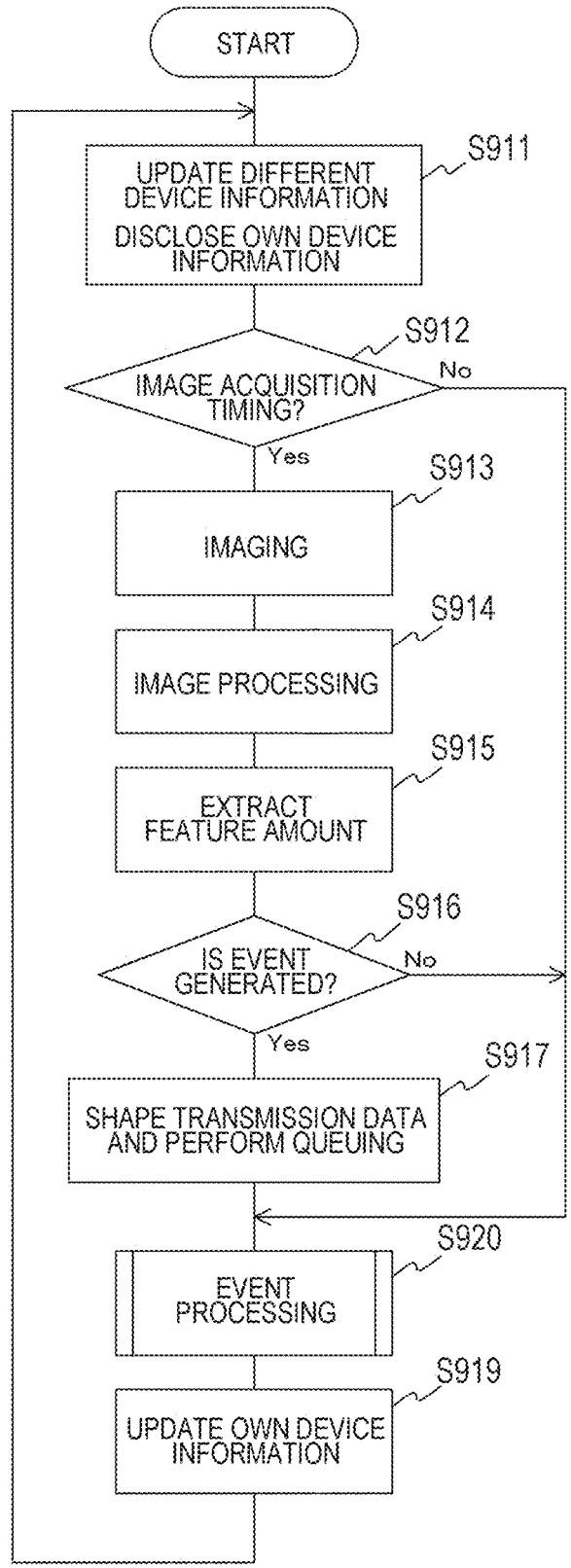
FIG. 6 is a flowchart illustrating an example of a processing procedure of a monitoring system in the embodiment of the present technology.

FIG. 6 is a flowchart illustrating an example of a processing procedure of a monitoring system in the embodiment of the present technology. By repeating the following procedure, each camera 100 updates device information managed in a device information management unit 142.

The device information management unit 142 updates device information related to a different camera 100 and discloses device information related to itself (step S911). Thus, a communication unit 150 mutually communicates with a different camera 100 and exchanges device information. Since a data amount is relatively small, communication in this case is performed by short-distance communication.

If image acquisition timing comes (step S912: Yes), processing in and after step S913 in the following is performed. For example, this image acquisition timing is previously determined as once in ten seconds or the like, and can be arbitrarily set and changed by a user.

An imaging unit 111 images an image in a monitoring range and acquires image data acquired as an imaging result (step S913). If the image data is acquired, an image processing unit 113 performs image processing as preprocessing with respect to the image data (step S914). Then, a feature amount extraction unit 131 extracts a feature amount necessary for detection of a specific event from the preprocessed image data (step S915).

A report determination unit 132 determines whether or not a specific event is generated on the basis of a change in a feature amount supplied from the feature amount extraction unit 131 (step S916). If it is determined that the specific event is generated (step S916: Yes), an image data encoding unit 121 encodes the image data, and a transmission data shaping unit 122 shapes the encoded image data as transmission data and performs queuing to a transmission buffer (step S917).

Thereafter, after event processing (step S920) is performed, the device information management unit 142 updates own device information (step S919). As described above, this updated own device information is disclosed to a different camera (step S911).

Figure 7:
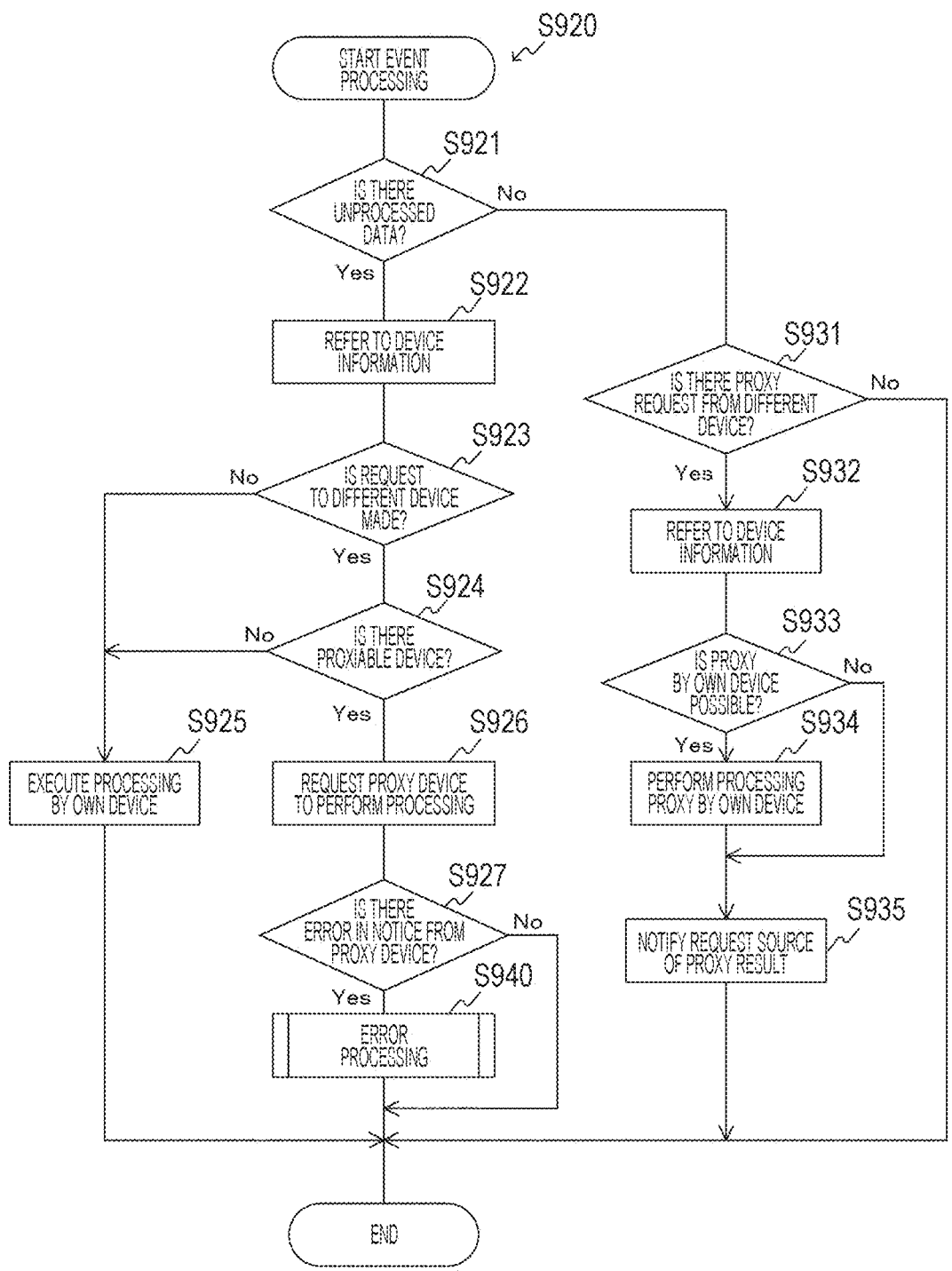
FIG. 7 is a flowchart illustrating an example of a processing procedure of event processing by a camera 100 in the embodiment of the present technology.

FIG. 7 is a flowchart illustrating an example of a processing procedure of the event processing (step S920) by the camera 100 in the embodiment of the present technology.

If there is unprocessed data of itself (step S921: Yes), the camera 100 performs processing in and after step S922 in the following. A device cooperative processing unit 143 refers to device information of an own device and a different device which information is managed in the device information management unit 142 (step S922), and determines whether or not to give a request for proxy of processing to a different camera 100 (step S923 and S924). In other words, a function that can be processed in the own device and a function that can be processed in a different device are compared with respect to unprocessed data and it is determined whether or not to give a request for proxy of processing to the different device.

In a case where it is determined that a request for proxy of processing is not given to the different device (step S923: No), or a case where there is no other proxiable device (step S924: No), the unprocessed data is processed in the own device (step S925). Here, device information of the own device is updated if necessary.

In a case where it is determined to give a request for proxy of processing to the different device (step S923: Yes) and there is a proxiable camera 100 (step S924: Yes), a request for proxy of processing is given to the camera 100 (step S926). With this arrangement, proxy processing is tried in a request destination and notification of a result thereof is given. Here, device information of the own device is updated if necessary. Furthermore, in a case where notification indicating that an error is generated is received from the camera 100 in the request destination of the proxy processing (step S927: Yes), error processing (step S940) is performed. This error processing will be described later.

The camera 100 performs processing in and after step S932 in the following in a case where it is determined, in step S921 described above, that there is no unprocessed data of itself (step S921: No) and there is a request for proxy of processing from a different device (step S931: Yes). The device cooperative processing unit 143 refers to device information of the own device which information is managed in the device information management unit 142 (step S932) and determines whether or not it is possible to perform proxy of processing in the own device (step S933). As a result, in a case where it is determined that proxy of the processing can be performed in the own device (step S933: Yes), proxy of the processing is performed in the own device (step S934).

Thereafter, the different device in the request source of proxy is notified of a proxy result (step S935). In other words, in a case where proxy of the processing in the own device (step S934) is successful, notification indicating that the proxy processing is ended is given. Furthermore, in a case where proxy of the processing cannot be performed (step S933: No) or proxy of the processing (step S934) fails as a result of performance thereof, notification indicating that the proxy processing cannot be performed and an error is generated is given.

Figure 8:
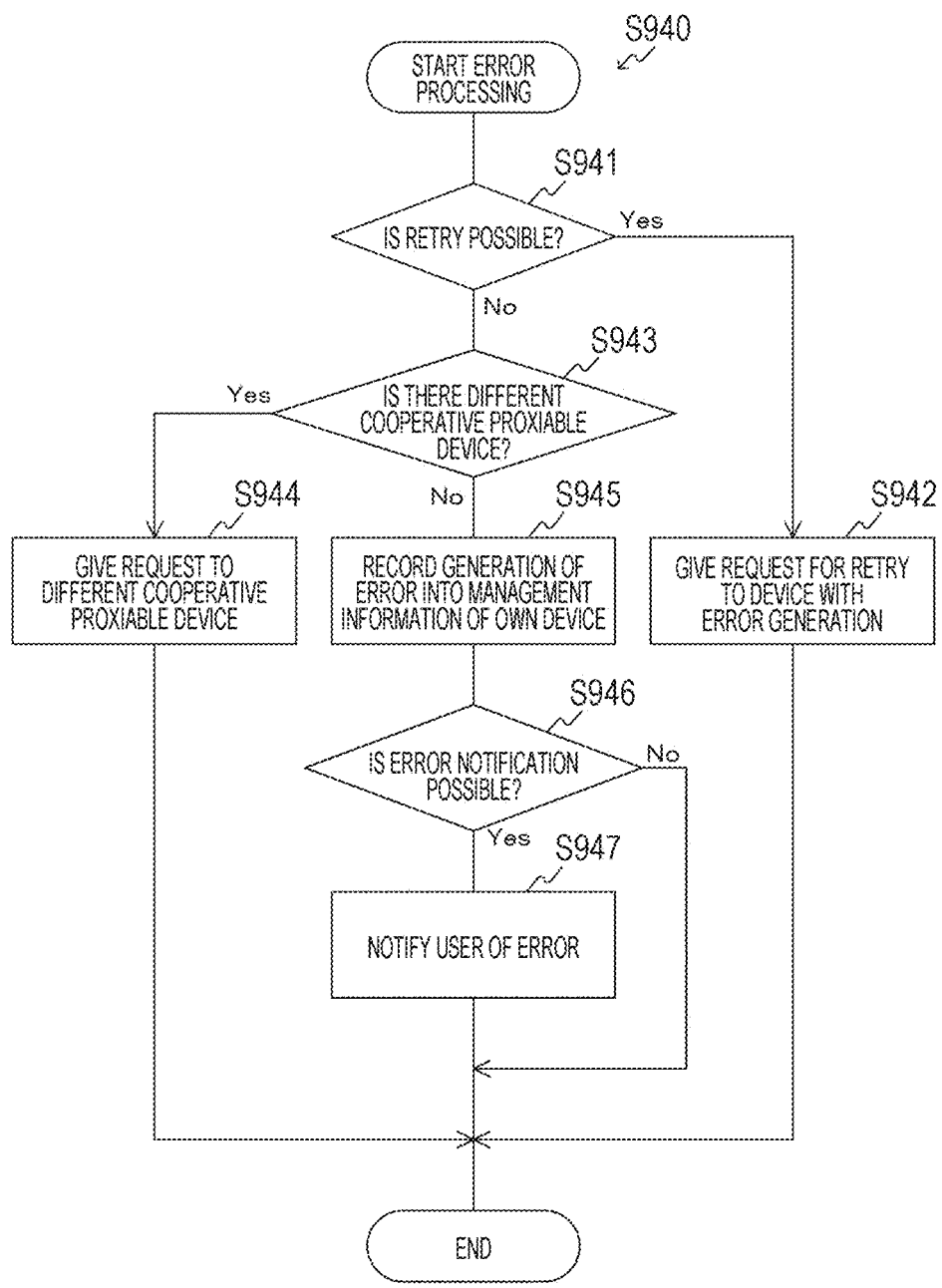
FIG. 8 is a flowchart illustrating an example of a processing procedure of error processing by the camera 100 in the embodiment of the present technology.

FIG. 8 is a flowchart illustrating an example of a processing procedure of the error processing (step S940) by the camera 100 in the embodiment of the present technology. As described above, in a case where notification indicating generation of an error is received from the camera 100 in the request destination of the proxy processing, the following error processing is performed according to a reason of the error.

First, if retry of the processing is possible (step S941: Yes), a request for retry is given to the camera 100 in which the error is generated (step S942). On the one hand, if retry of the processing is not possible (step S941: No), the device cooperative processing unit 143 refers to the device information of the own device which information is managed in the device information management unit 142 and searches for a different camera 100 that can perform proxy of the processing in cooperation (step S943). As a result of the search, in a case where there is a different camera 100 that can perform proxy of the processing (step S943: Yes), a new request for proxy of the processing is given to the camera 100 (step S944).

On the one hand, in a case where there is no other camera 100 that can perform proxy of the processing (step S943: No), the device information management unit 142 records generation of the error into the management information of the own device (step S945). Here, in a case where the notification of the error can be given to a user (step S946: Yes), the notification of the error is given to the user (step S947). For example, the notification is transmitted to a mobile terminal 510 by long-distance communication. Moreover, a lighting unit 104 of the camera 100 may be made to blink, or a warning sound may be output from the speaker 103. In such notification of an error, proxy of processing may be also performed by cooperation between devices. In other words, it is possible to try to realize what has high effectiveness by a notification method.

In such a manner, according to a monitoring system of a first embodiment of the present technology, cooperative processing with a different camera 100 can be performed since a plurality of cameras 100 mutually gives a request for proxy of processing to a different device and performs proxy of processing requested by a different device.

2. Second Embodiment

In the above-described first embodiment, an outline of proxy processing of an event has been described. In the following embodiment, each use case is assumed and more detailed processing will be described.

[Configuration of System]

Figure 9:
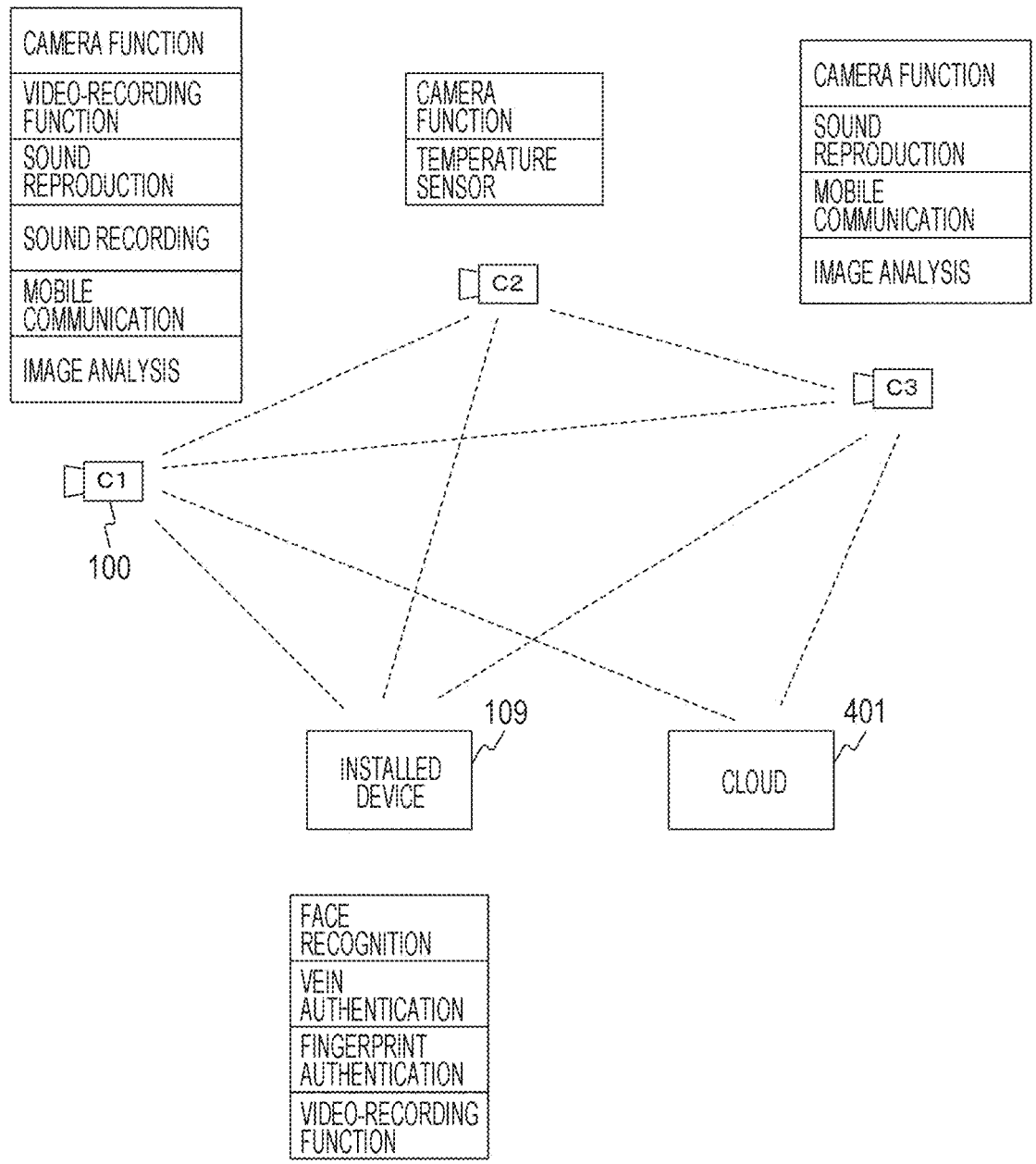
FIG. 9 is a view illustrating a configuration example of a system in a second embodiment of the present technology.

FIG. 9 is a view illustrating a configuration example of a system in a second embodiment of the present technology. A system in this example includes three cameras 100, an installed device 109, and a cloud 401. Identification numbers C1, C2, and C3 are respectively assigned to the three cameras 100. The installed device 109 is an installed (on-premise)-type device. The cloud 401 is a device accessed through a network.

In this example, the camera C1 includes a camera function, a video-recording function, a sound-reproducing function, a sound-recording function, a mobile communication function, and an image analysis (vision computing) function. The camera C2 includes a camera function and a temperature sensor function. The camera C3 includes a camera function, a sound-reproducing function, a mobile communication function, and an image analysis function. The installed device 109 includes a face recognition function, a vein authentication function, a fingerprint authentication function, and a video-recording function.

[First Use Case]

In the first use case, a case where image data imaged by the camera C2 is recorded in a system in FIG. 9 in response to generation of a specific event is assumed. In this case, since not including a video-recording function in an own device, the camera C2 gives a request for proxy of video-recording processing to a different device.

Here, it is assumed that the camera C1 is selected as a request destination. With this arrangement, the image data imaged by the camera C2 is streamed and transferred to the camera C1 through short-distance communication, and recorded into a storage of the camera C1 by the video-recording function of the camera C1.

Note that a plurality of storages may be used although it is assumed to perform recording into one storage in this example. With this arrangement, storages of a whole system connected to a network can be used like a storage of the own device. Furthermore, even if there is no more capacity in a certain storage, recording can be continued by utilization of a different storage. In this case, it is considered to perform recording into a storage with the largest capacity with respect to a used amount of each storage.

FIG. 10 is a view illustrating a detailed example of management information in the second embodiment of the present technology. In the above-described example, in a case where the image data imaged by the camera C2 is recorded as a moving-image file into a storage of the camera C1, management information of each becomes a manner illustrated in the drawing. In other words, a "form", "time", a "request device", and "contents" of a file are respectively recorded in association with an index to uniquely identify the file in management information of the cameras C1 and C2. These items indicate request contents of when a request for proxy processing is given to a different device, or request contents of when a request for proxy processing is received from a different device.

The "form" is a form of the file. Since a moving-image file is assumed in this example, a "moving image" is written. The "time" indicates recording time of the file, and start time and end time are written.

The "request device" is an identifier to uniquely identify a device in a request source or a request destination of the file. A request device in the management information of the camera C1 is "C2", and it is indicated that a device that is a source of a request for video-recording processing is the camera C2. A request device in the management information of the camera C2 is "C1", and it is indicated that a device in a destination of a request for proxy processing of the video-recording processing is the camera C1.

In a case where a corresponding file is stored in a storage in a device, the "contents" indicates the stored place. On the one hand, in a case where a corresponding file is not stored in a storage in a device, contents of an event is written. In this example, "intruder detection" is written.

With reference to the own management information, the camera C2 grasps that a device in a destination of a request for proxy processing of the video-recording processing is the camera C1. In order to reproduce the recorded contents, a request for supply of video data is given to the camera C1. With reference to the own management information, the camera C1 can recognize and follow a stored place of the video data and can supply contents of the video data to the camera C2.

Figure 11:
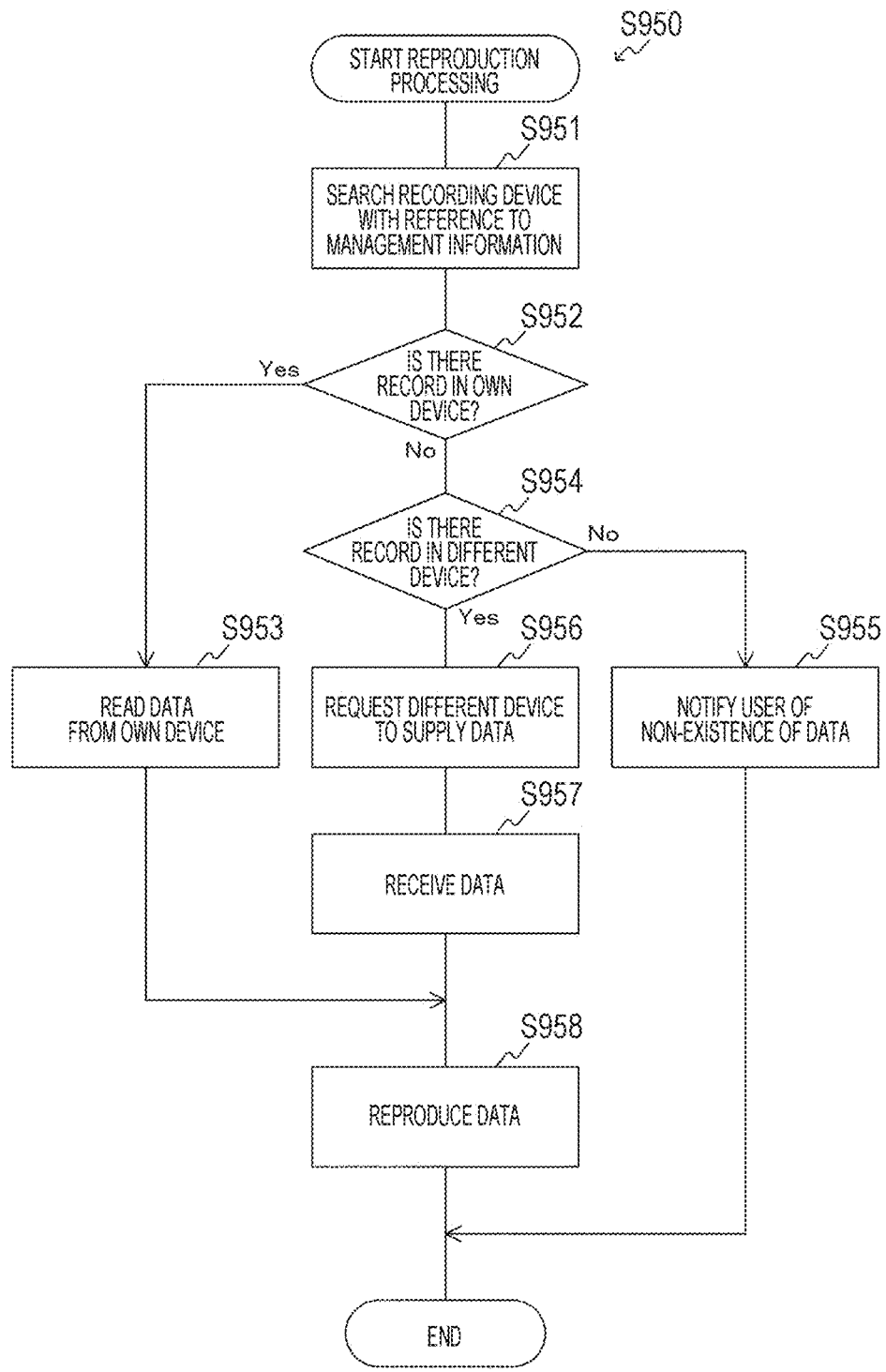
FIG. 11 is a flowchart illustrating an example of a processing procedure of reproducing processing of recorded contents by a camera 100 in an embodiment of the present technology.

FIG. 11 is a flowchart illustrating an example of a processing procedure of reproducing processing of recorded contents by a camera 100 in an embodiment of the present technology.

In reproducing recorded contents, a camera 100 refers to management information held in a device information management unit 142 of the own device and searches for a device that records video data to be reproduced among a plurality of cameras 100 (step S951). As a result, if it is found that the record is in the own device (step S952: Yes), the video data is read from the own device (step S953) and reproduction is performed (step S958).

On the one hand, in a case where the record is not in the own device (step S952: No), if the record is in a different device (step S954: Yes), a request for supply of the video data is given to the device (step S956). Then, if the video data is received from the request destination (step S957), the video data is reproduced (step S958).

Furthermore, if the record is not in a different device (step S954: No), notification indicating that the data does not exist is given to a user (step S955). For example, there is a case where a device in a record destination cannot be found due to a removal, breakdown, or the like. Here, for example, it is considered to output a message such as "Video data (record destination: C1) is not found. Please check a state of C1".

[Second Use Case]

In the second use case, a case where an image analysis of image data imaged by the camera C2 is performed and recording along with a result of the analysis is performed in the system in FIG. 9 in response to generation of a specific event is assumed. In this case, since not including an image analysis function and a video-recording function in an own device, the camera C2 gives a request for proxy of the image analysis function and video-recording processing to a different device.

Here, it is assumed that a camera C3 is selected as a request destination of proxy processing of mobile communication in order to execute an image analysis in the cloud 401. With this arrangement, image data imaged by the camera C2 is streamed and transferred to the camera C3 through short-distance communication, and a request for an image analysis is given to the cloud 401 by a mobile communication function of the camera C3. The image analysis is performed in the cloud 401 and notification of the analysis result data is given to the camera C2 through the camera C3.

Furthermore, it is assumed that the camera C2 selects the camera C1 as a proxy request destination of a video-recording function. With this arrangement, the image data imaged by the camera C2 and the analysis result data by the cloud 401 are streamed and transferred to the camera C1 through short-distance communication, and recorded into a storage of the camera C1 by the video-recording function of the camera C1.

[Third Use Case]

In the third use case, the following is assumed. That is, in the system in FIG. 9, image data imaged by the camera C2 is recorded and face recognition is performed in response to generation of a specific event, and in a case where an abnormal person is detected as a result thereof, notification is given to the outside by an output of a warning sound. In this case, since these functions are not included in the own device, the camera C2 gives a request for proxy of each processing to a different device.

First, it is assumed that an installed device 109 is selected as a request destination of proxy processing to perform face recognition and video recording. With this arrangement, the image data imaged by the camera C2 is streamed and transferred to the installed device 109 through short-distance communication, and face recognition processing and video-recording processing are performed in the installed device 109. If it is determined that there is an abnormal person as a result of the face recognition in the installed device 109, notification of the recognition result is given to the camera C2.

Here, it is assumed that the camera C2 selects the camera C1 as a proxy request destination of sound reproduction. With this arrangement, warning sound data from the camera C2 is transferred to the camera C1 through short-distance communication, and a warning sound is output from the camera C1 by the sound-reproducing function of the camera C1.

Furthermore, it is assumed that the camera C2 selects the camera C3 as a proxy request destination of mobile communication in order to give notification indicating detection of an abnormal person to a mobile terminal from the cloud 401. With this arrangement, notification contents from the camera C2 are transferred to the camera C3 through short-distance communication, the notification is transmitted to the cloud 401 by the mobile communication function of the camera C3, and the notification is given from the cloud 401 to the mobile terminal.

In such a manner, according to the second embodiment of the present technology, it is possible to realize processing as a whole system by giving a request for proxy of processing that cannot be handled by an own device to a different device with respect to generation of a specific event.

3. Third Embodiment

In the above-described second embodiment, an uneven system in which each device includes a unique function is assumed. It is possible to provide a high function as the whole system by providing many devices with a low function and a low price. In this third embodiment, a system in which simple devices are included with functions being collected to a specific device will be described.

[Configuration of System]

Figure 12:
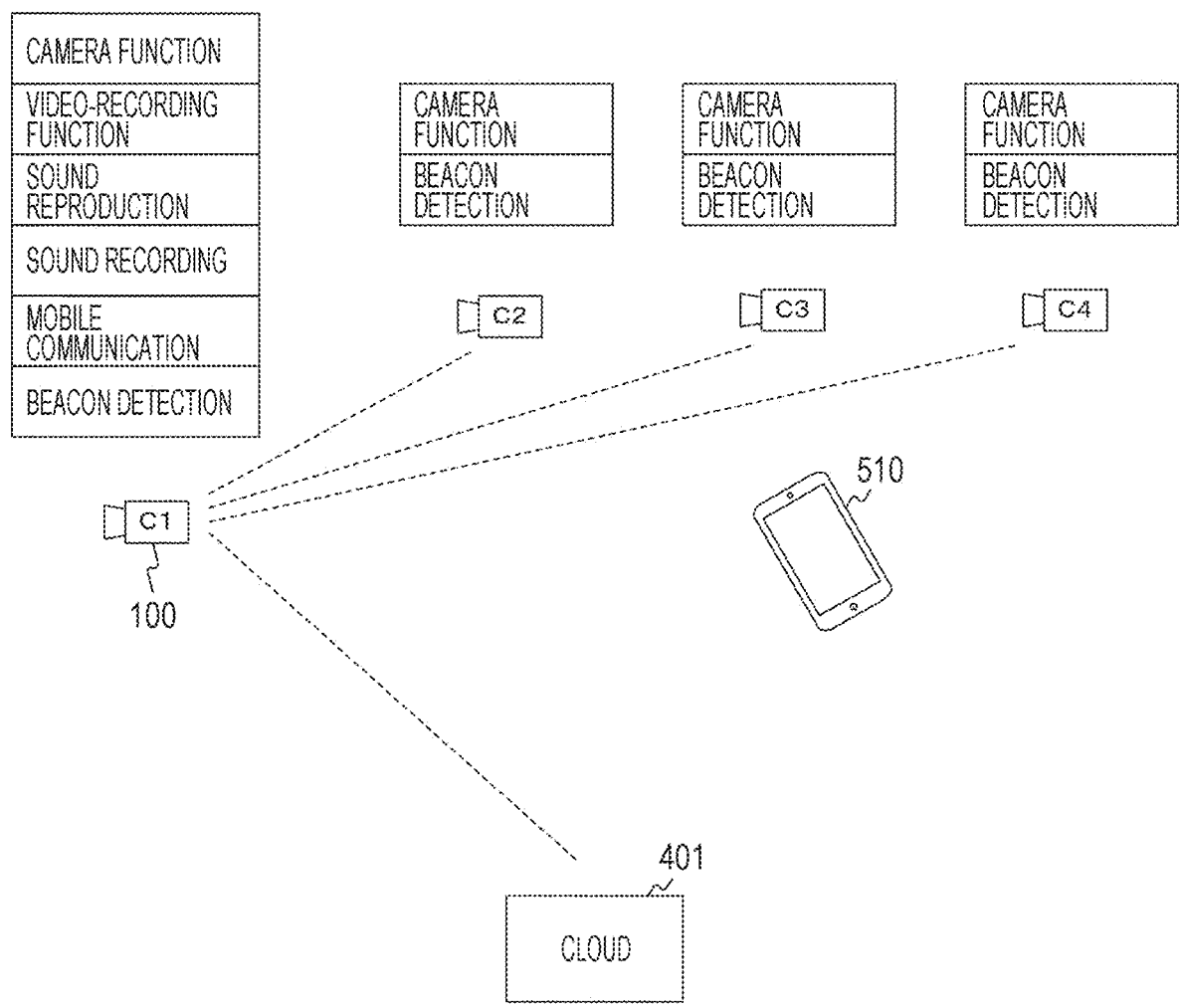
FIG. 12 is a view illustrating a configuration example of a system in a third embodiment of the present technology.

FIG. 12 is a view illustrating a configuration example of a system in the third embodiment of the present technology. A system in this example includes four cameras 100 and a cloud 401. Identification numbers C1 to C4 are respectively assigned to the four cameras 100. Among these, the camera C1 includes an advanced function, and the other cameras C2 to 4 are devices with a low function and a low price. The cloud 401 is a device accessed through a network.

In this example, the camera C1 includes a camera function, a video-recording function, a sound-reproducing function, a sound-recording function, a mobile communication function, and a beacon detection function. On the one hand, the cameras C2 to 4 include a camera function and a beacon detection function. In such a manner, the cameras C1 to 4 include a beacon detection function and detect a beacon signal emitted from a mobile terminal 510. The mobile terminal 510 emits a beacon signal. If a user moves with the mobile terminal 510, the cameras C1 to 4 receive and detect the beacon signal. With this detection of the beacon signal as a specific event, the cameras C1 to 4 execute video-recording processing.

In a case of detecting the beacon signal by itself, the camera C1 performs recording into a storage of an own device by using a video-recording function of the own device. On the one hand, in a case of detecting the beacon signal, the cameras C2 to 4 give a request for proxy of video-recording processing to the camera C1 since the video-recording function is not included in own devices. With this arrangement, image data imaged by any of the cameras C2 to 4 is streamed and transferred to the camera C1 through short-distance communication and recorded into the storage of the camera C1.

In such a manner, according to the third embodiment of the present technology, it is possible to provide an advanced function as a whole system by providing many devices with a low function and a low price and giving a request for processing proxy to a device including an advanced function with detection of a beacon signal as a specific event.

4. Fourth Embodiment

In the above-described third embodiment, an example in which recording is performed with detection of a beacon signal as a specific event has been described. However, it is possible to build a system without a beacon signal being used an assumption. In this fourth embodiment, an example of performing proxy of detection processing for a specific event will be described.

[Configuration of System]

Figure 13:
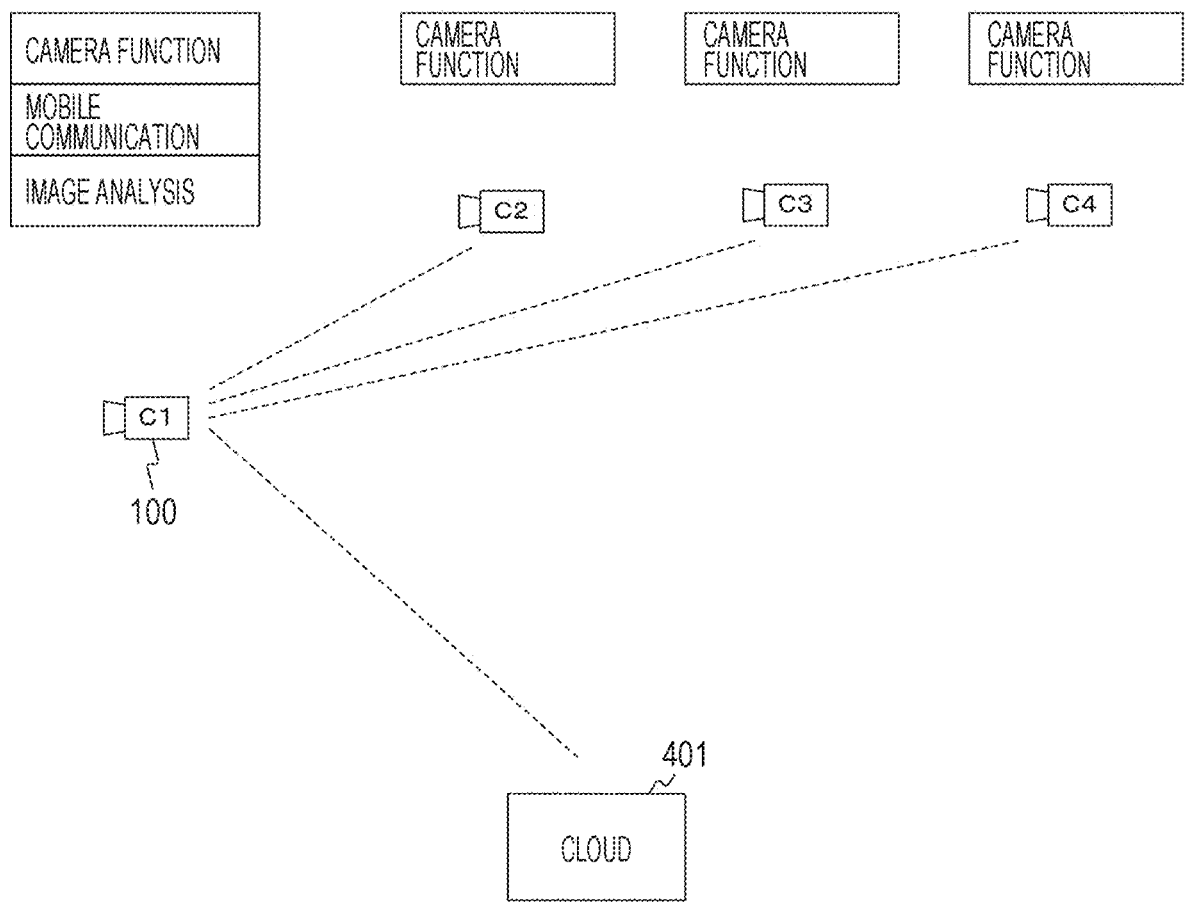
FIG. 13 is a view illustrating a configuration example of a system in a fourth embodiment of the present technology.

FIG. 13 is a view illustrating a configuration example of a system in the fourth embodiment of the present technology. A system in this example includes four cameras 100 and a cloud 401. Identification numbers C1 to C4 are respectively assigned to the four cameras 100. Among these, the camera C1 includes an advanced function, and the other cameras C2 to 4 are devices with a low function and a low price. The cloud 401 is a device accessed through a network.

In this example, the camera C1 includes a camera function, a video-recording function, a sound-reproducing function, a sound-recording function, a mobile communication function, and an image analysis function. On the one hand, the cameras C2 to 4 include a camera function. The cameras C2 to 4 transmit imaged image data to the camera C1 through short-distance communication, for example, in a frequency of once in 30 minutes and give a request for an image analysis. In a case where a trouble is detected as a result of that, it is assumed that a specific event is generated and a device in a request source is notified of the analysis result.

As an operation of when a trouble is detected, processing similar to those in the above-described embodiments can be performed. For example, notification indicating trouble generation is transmitted to the cloud 401 by the mobile communication function of the camera C1, and the notification is given from the cloud 401 to a mobile terminal.

In such a manner, according to the fourth embodiment of the present technology, it is possible to provide many devices with a low function and a low price and to give a request for processing proxy to a device including an advanced function. There is an advantage for a user that it becomes possible to use an existing resource, or to add a function at low cost. Furthermore, although peak power consumption becomes large if a plurality of devices including a plurality of functions operates the functions simultaneously, it is possible to prevent thermal runaway due to an amount of heat generation by spreading a load in a manner of this embodiment.

5. Fifth Embodiment

In the above-described embodiments, generation of a specific event is detected on the basis of moving image data. However, generation of a specific event may be detected on the basis of different information. In this fifth embodiment, an example of detecting generation of a specific event on the basis of sound data as surrounding information will be described.

[Configuration of System]

Figure 14:
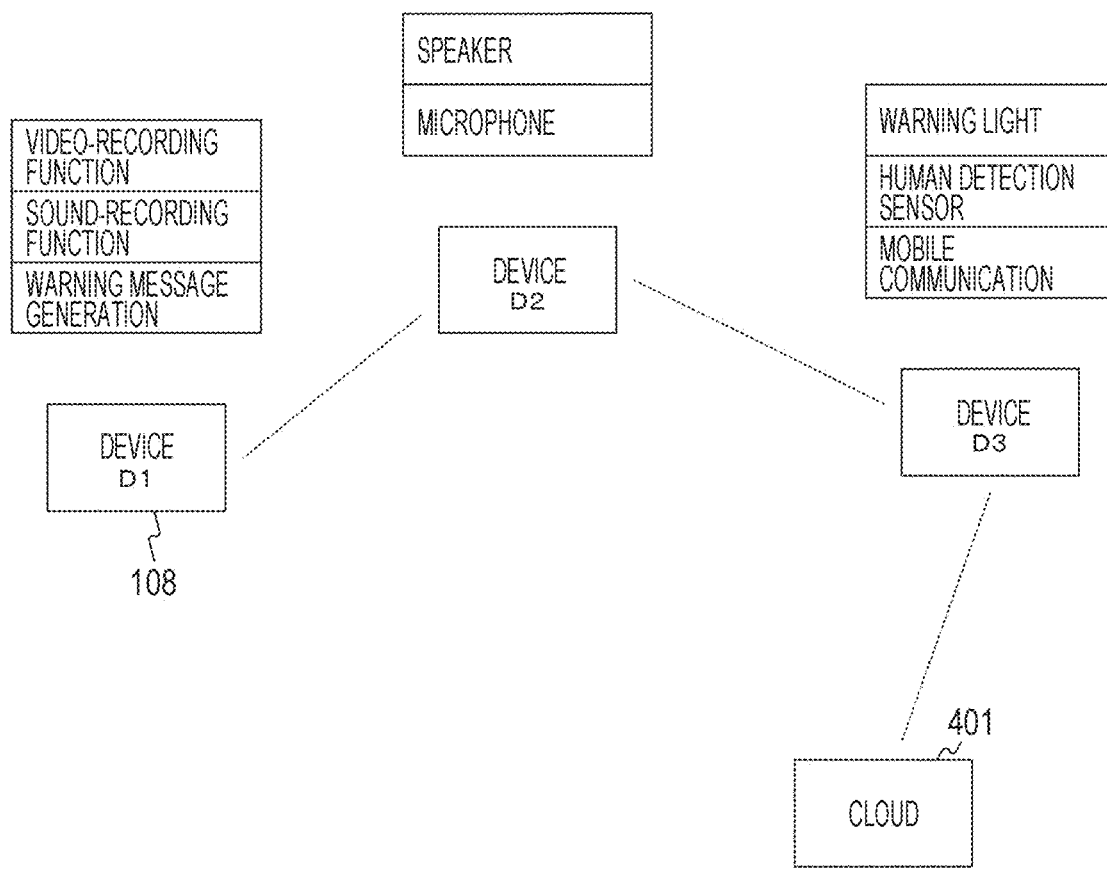
FIG. 14 is a view illustrating a configuration example of a system in a fifth embodiment of the present technology.

FIG. 14 is a view illustrating a configuration example of a system in the fifth embodiment of the present technology. A system in this example includes three devices 108 and a cloud 401. Identification numbers D1 to D3 are respectively assigned to the three devices 108. The cloud 401 is a device accessed through a network.

In this example, the device D1 includes a video-recording function, a sound-recording function, and a warning message-generating function. The device D2 includes a speaker and a microphone. The device D3 includes a warning light, a human detection sensor, and a mobile communication function.

Here, it is assumed to perform sound-recording processing, to output a warning sound, and to turn on a warning light according to a sound analysis result while recording sound data acquired by the microphone of the device D2. First, the device D2 gives a request for proxy processing for recording sound data acquired by the microphone to the device D1. With this arrangement, sound recording is performed in the device D1.

Furthermore, the device D2 selects the device D3 as a proxy request destination of mobile communication in order to give the cloud 401 a request for an analysis of the sound data acquired by the microphone. With this arrangement, the sound data from the device D2 is transferred to the device D3 through short-distance communication, and the sound data is transmitted to the cloud 401 by the mobile communication function of the device D3. Here, it is assumed that determination of "woman, scream" is made as a result of the sound analysis in the cloud 401. The device D2 is notified of this determination result through the device D3.

The device D2 receiving the notification gives the device D1 a request for proxy processing of generating a warning message based on "woman, scream". The device D1 receiving this request generates a warning message such as "A trouble is detected. Warning. A scream of a woman is detected!" by using a text to speech (TTS) technology, for example. Sound data of this warning message is transmitted to the device D2, and a warning sound corresponding to the warning message is output from the speaker of the device D2.

Furthermore, the device D2 gives the device D3 a request for proxy processing of turning on the warning light. With this arrangement, the warning light of the device D3 is turned on.

In a case of this example, it is possible to build a warning system at low cost as a whole by installing many low-price devices D2 and installing one each of the devices D1 to D3.

In such a manner, according to the fifth embodiment of the present technology, it is possible to detect generation of a specific event on the basis of sound data and to give a request for proxy of processing to a different device.

6. Sixth Embodiment

In the above-described embodiments, a request for proxy of processing is given with a focus on a function of each device. However, a request for proxy of processing may be given with a state of each device as an index. In this sixth embodiment, an example of giving a request for proxy of processing with a state of a battery as an index will be described. In the following, a case where a function associated with event processing is included in an own device and a request for proxy processing is given to a different device for a load distribution according to a state of a battery will be described.

Figure 15:
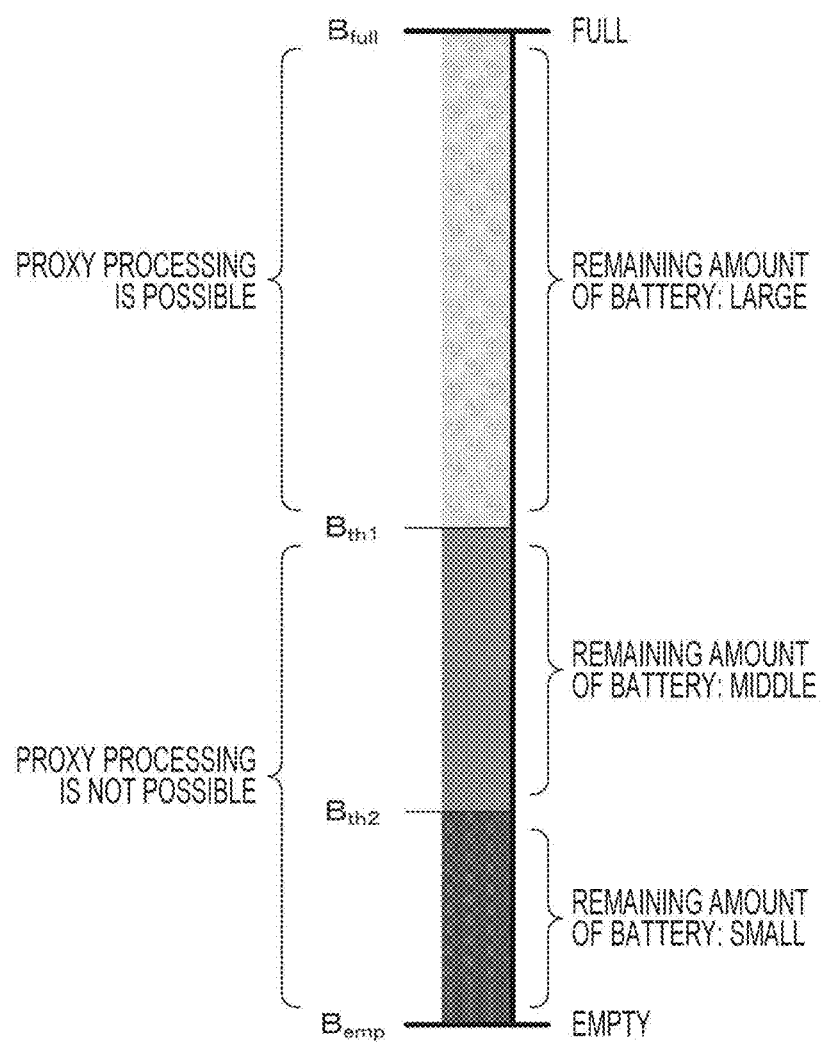
FIG. 15 is a view illustrating an example of a relationship between a remaining amount of a battery and proxy processing in a sixth embodiment of the present technology.

FIG. 15 is a view illustrating an example of a relationship between a remaining amount of a battery and proxy processing in the sixth embodiment of the present technology. In this example, the remaining amount of a battery is divided into three stages of "large", "middle", and "small". If the remaining amount of a battery is equal to or larger than a threshold $B_{th1}$, the remaining amount of a battery is classified into "large". If the remaining amount of a battery is equal to or larger than a threshold $B_{th2}$ and is smaller than the threshold $B_{th1}$, the remaining amount of a battery is classified into "middle". If the remaining amount of a battery is smaller than the threshold $B_{th2}$, the remaining amount of a battery is classified into "small".

In a case where the remaining amount of a battery is classified into "large", processing is executed in an own device without giving a request for proxy of the processing if the own device includes a corresponding function. Furthermore, in a case where a request for processing proxy is received from a different device, the processing is executed if the own device includes a corresponding function.

In a case where the remaining amount of a battery is classified into "middle", a request for proxy of processing is basically given to a different device. However, in a case where a different device to be a request destination is not found, the processing is executed in the own device if a corresponding function is included in the own device. Furthermore, in a case where a request for processing proxy is received from a different device, notification that the proxy processing is impossible is given to the request source.

In a case where the remaining amount of a battery is classified into "small", a request for proxy of processing is given to a different device. Furthermore, in a case where a request for processing proxy is received from a different device, notification that the proxy processing is impossible is given to the request source.

Figure 16A:
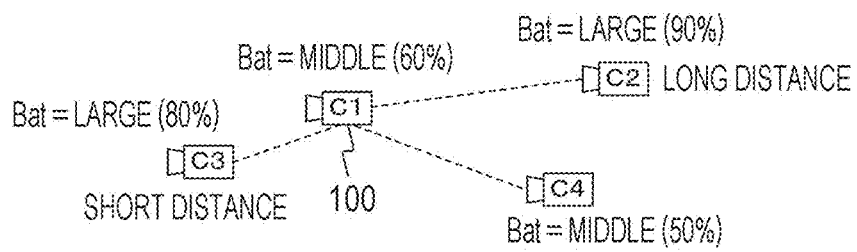
FIGS. 16A, 16B, and 16C is a are views illustrating a detailed example of the proxy processing in the sixth embodiment of the present technology.
Figure 16B:
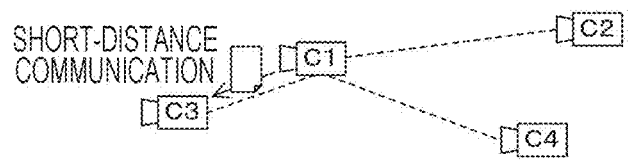
Figure 16C:
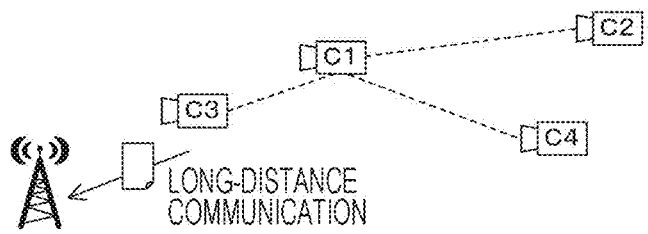

FIGS. 16A, 16B, and 16C are views illustrating a detailed example of proxy processing in the sixth embodiment of the present technology. As indicated by a in the drawing, it is assumed that a remaining amount of a battery of a camera C1 is 60% and classified into "middle". Furthermore, it is assumed that a remaining amount of a battery of a camera C2 is 90% and classified into "large". Furthermore, it is assumed that a remaining amount of a battery of a camera C3 is 80% and classified into "large". Furthermore, it is assumed that a remaining amount of a battery of a camera C4 is 50% and classified into "middle".

In order to give a request for proxy processing to a different device, the camera C1 refers to device information of the different device and checks states of the other cameras C2 to 4. As a result, the camera C3 the remaining amount of a battery of which is classified to "large" and an installation position of which is the closest to the camera C1 is selected as a request destination of the proxy processing. With this arrangement, for example, by short-distance communication, the camera C1 gives the camera C3 a request for proxy transmission of image data to a server as indicated by b in the drawing.

The camera C3 receiving the request for proxy transmission transmits the image data to the server through a base station by long-distance communication as indicated by c in the drawing.

In such a manner, it is possible to give a request for proxy of processing with a state of each device as an index according to the sixth embodiment of the present technology.

Note that an example of selecting a request destination with a remaining amount of a battery and an installation position as an index has been described here. However, the index is just an example. For example, in addition to the remaining amount of a battery and the installation position, a device with an interval of event detection being long may be selected. With this arrangement, it is possible to select a device with a low recent operation rate.

Modification Example

Figure 17:
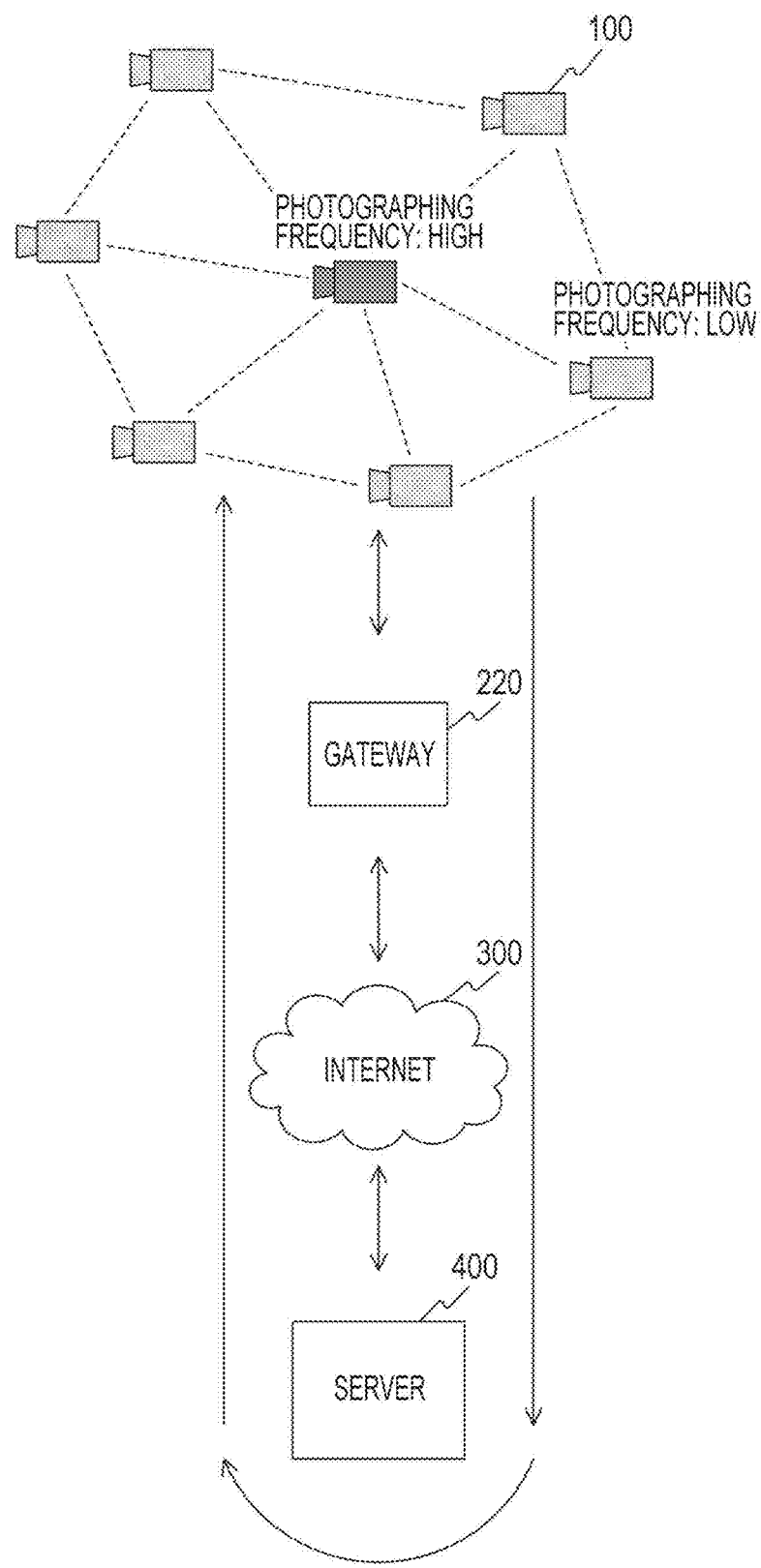
FIG. 17 is a view illustrating a configuration example of a system in a modification example of the sixth embodiment of the present technology.

FIG. 17 is a view illustrating a configuration example of a system in a modification example of the sixth embodiment of the present technology. In the above-described embodiments, each camera 100 autonomously determines whether or not a request for proxy processing is possible. However, this determination may be performed intensively by a server.

In this example, all cameras 100 include a mobile communication function and can be connected from a gateway 220 to a server 400 through the Internet 300. Furthermore, functions of the cameras 100 are common, and proxy processing of processing in any of the cameras 100 is performed by a different camera 100 according to a remaining amount of a battery.

Therefore, each of the cameras 100 periodically notify the server 400 of a remaining amount of a battery. The server 400 monitors an event generation frequency or a battery consuming speed of all cameras 100. Then, if a variation is generated in a remaining amount of a battery among the cameras 100, the server 400 instructs a different camera 100 to perform proxy of processing in any of the cameras 100 for a load distribution. For example, the server 400 gives an instruction that proxy processing of image data transmission processing of a camera 100 with a high photographing frequency is performed by a different camera 100 with a low photographing frequency.

Figure 18:
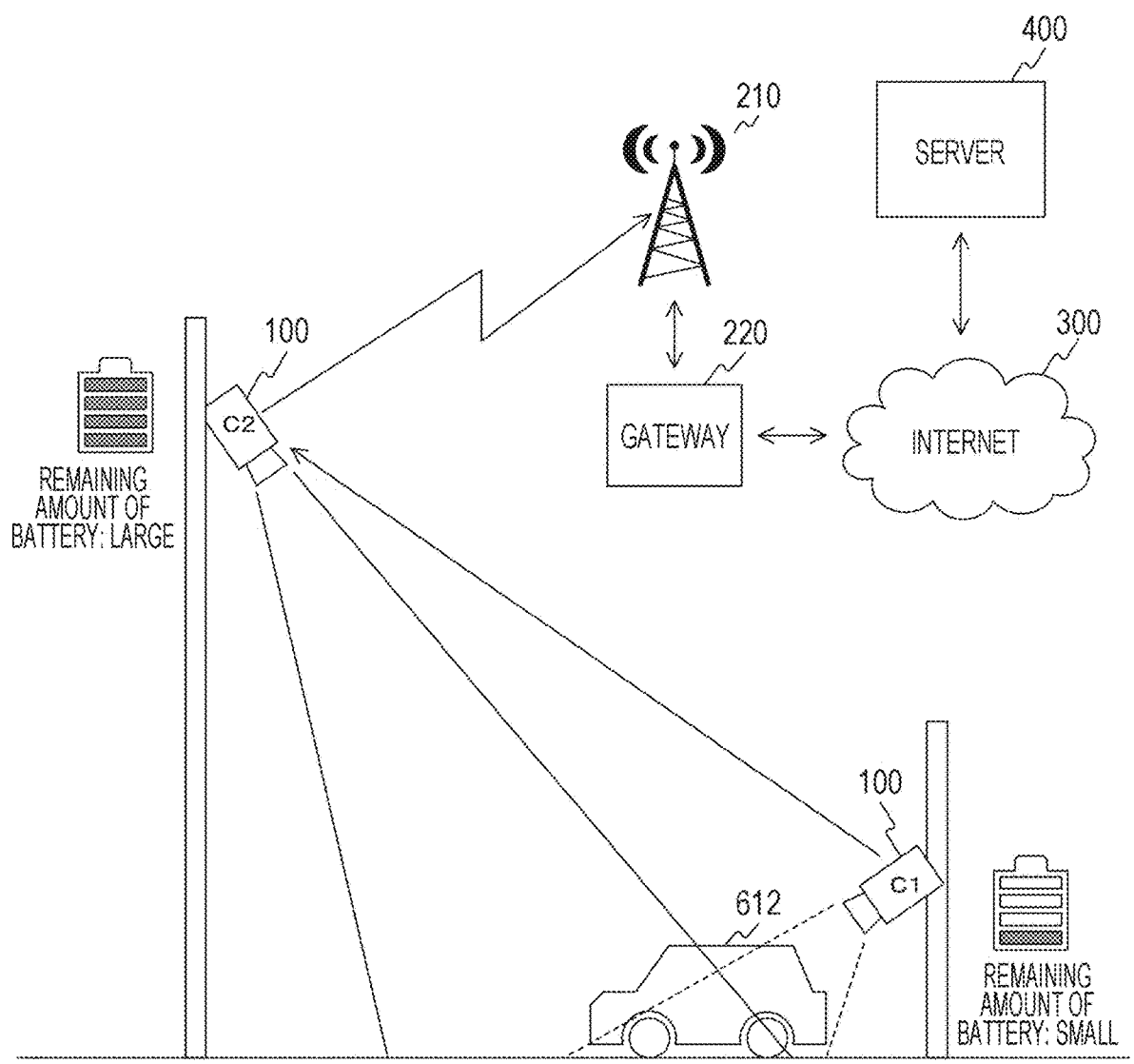
FIG. 18 is a view illustrating a configuration example of a system in a different modification example of the sixth embodiment of the present technology.

FIG. 18 is a view illustrating a configuration example of a system in a different modification example of the sixth embodiment of the present technology. In this example, in a case where a camera 100 with a low remaining amount of a battery detects a specific event, a server 400 gives an instruction to a different camera 100, which has a different photographing range, to perform proxy processing such as photographing. With this arrangement, it is possible to smooth power consumption.

For example, if detecting an intrusion of an automobile 612 at a range very close to an own device, a camera C1 gives notification thereof to the server 400 through a base station 210. With this arrangement, the server 400 searches for a different camera C2 that has a large remaining amount of a battery and includes the automobile 612 in a photographing range, and instructs the camera C2 to perform proxy processing of imaging. With this arrangement, the camera C2 performs imaging, and transmits acquired image data to the server 400.

In such a manner, according to embodiments of the present technology, it is possible to perform cooperative processing by devices in a system by performing proxy processing between the devices connected to a network. Therefore, it is not necessary to provide all functions to be realized in a system to all devices and unification to devices with the same function and performance becomes unnecessary, whereby it is possible to reduce a cost in system introduction. Furthermore, in a case where a shortage in a resource such as a battery or a recording storage is generated, it is possible to distribute a load and to smooth a resource in a whole system by giving a request for proxy processing to a different device. Furthermore, even in a case where a breakdown of a device or the like is generated after a system is built, it is not necessary to replace all devices. Moreover, by adding a device with a new function, it is possible to improve a function and performance of a whole system. Then, it becomes possible to dynamically change a system configuration by cooperative processing with a different device. With these, a function of the whole system is improved and operating time is extended, whereby a maintenance cost of the system can be reduced.

Note that the above embodiments are described as examples to embody the present technology. Matters in the embodiments and matters to specify the invention in claims respectively correspond to each other. Similarly, the matters to specify the invention in claims and matters having names identical thereto in the embodiments of the present technology respectively correspond to each other. However, the present technology is not limited to the embodiments and can be embodied by various modifications of the embodiments within the spirit and the scope thereof.

Furthermore, the processing procedures described in the above embodiments may be considered as a method including a series of these procedures, or may be considered as a program to cause a computer to execute a series of these procedures or a recording medium storing the program. As this recording medium, for example, a compact disc (CD), a MiniDisc (MD), a digital versatile disc (DVD), a memory card, or a Blu-ray (registered trade mark) disc can be used.

Note that an effect described in the present description is just an example and not the limitation. Furthermore, there may be a different effect.

Note that the present technology may include the following configuration.

(1) An electronic device including:

a device information management unit configured to manage device information related to a different device connected through a network;

an acquisition unit configured to acquire surrounding information;

a detection unit configured to detect generation of a specific event on the basis of the acquired surrounding information; and a device cooperative processing unit configured to select, in a case where a function necessary for processing the surrounding information in response to detection of the specific event is not included in itself, a device including the function from the different device on the basis of the device information and to give a request for proxy of the processing thereto through the network.

(2) The electronic device according to (1), in which the device information management unit further manages request contents of when the request for proxy is given to the different device.

(3) The electronic device according to (1) or (2), in which in a case where an error is generated in the device to which the request for proxy is given, the device cooperative processing unit selects a further different device including the function from the different device on the basis of the device information and gives a request for proxy of the processing thereto through the network.

(4) The electronic device according to any one of (1) to (3), in which the device information management unit further manages device information related to an own device, and the device cooperative processing unit determines, in a case where a request for proxy of processing is received from the different device, whether or not the requested proxy of processing can be performed on the basis of the device information related to the own device.

(5) The electronic device according to (4), in which the device information management unit further manages request contents of when the request for proxy of processing is received from the different device.

(6) The electronic device according to any one of (1) to (5), in which the device information includes list information of a function that can be provided as proxy processing to a different device by each device.

(7) The electronic device according to (6), in which the function that can be provided varies dynamically according to a processing load of the device.

(8) The electronic device according to any one of (1) to (7), in which the acquisition unit images and acquires image data as the surrounding information.

(9) The electronic device according to any one of (1) to (7), in which the acquisition unit measures and acquires at least one of sound, temperature, humidity, pressure, acceleration, magnetism, or an amount of radiation as the surrounding information.

(10) A processing proxy requesting method of an electronic device, including:
an acquiring step of acquiring surrounding information by an acquisition unit;
a detecting step of detecting generation of a specific event by a detection unit on the basis of the acquired surrounding information; and
in a case where a function necessary for processing the surrounding information in response to detection of the specific event is not included in itself, a device cooperative processing step of selecting, on the basis of device information related to a different device connected through a network, a device including the function from the different device and giving a request for proxy of the processing thereto through the network by a device cooperative processing unit.

(11) An information processing system including: a plurality of electronic devices connected through a network,
in which each of the plurality of electronic devices includes
a device information management unit configured to manage device information related to a different device,
an acquisition unit configured to acquire surrounding information,
a detection unit configured to detect generation of a specific event on the basis of the acquired surrounding information, and
a device cooperative processing unit configured to select, in a case where a function necessary for processing the surrounding information in response to detection of the specific event is not included in itself, a device including the function from the different device on the basis of the device information and to give a request for proxy of the processing thereto through the network.

REFERENCE SIGNS LIST

100 Camera
101 Imaging unit
102 Microphone
103 Speaker
104 Lighting unit
105 Solar panel
108 Device
109 Installed device
110 Sensing unit
111 Imaging unit
112 Sensor
113 Image processing unit
114 Signal processing unit
120 Data processing unit
121 Image data encoding unit
122 Transmission data shaping unit
130 Recognition processing unit
131 Feature amount extraction unit
132 Report determination unit
140 Control unit
141 Power-supply control unit
142 Device information management unit
143 Device cooperative processing unit
150 Communication unit
151 Communication interface
210 Base station
220 Gateway
300 Internet
400 Server
401 Cloud
510 Mobile terminal
520 Surveillance monitor

The invention claimed is:

1. An electronic device, comprising:
circuitry configured to:
manage device information related to a plurality of devices connected through a network, wherein the plurality of devices includes the electronic device;
acquire surrounding information;
detect a specific event based on the acquired surrounding information;
determine, based on the detection of the specific event, a function for a process of the surrounding information is absent in the electronic device;
select, based on the device information and the determination the function for the process of the surrounding information is absent in the electronic device, a first device including the function from the plurality of devices, wherein the first device is different from the electronic device; and
transmit, to the first device through the network, a first request for proxy of the process of the surrounding information.

2. The electronic device according to claim 1, wherein the circuitry is further configured to manage request contents of the first request transmitted to the first device.

3. The electronic device according to claim 1, wherein in a case where an error is generated in the first device to which the first request is transmitted, the circuitry is further configured to:
select, based on the device information, a second device including the function from the plurality of devices, wherein the second device is different from each of the first device and the electronic device; and
transmit, to the second device through the network, a second request for the proxy of the process of the surrounding information.

4. The electronic device according to claim 1, wherein the circuitry is further configured to:
receive a second request from a second device of the plurality of devices; and
determine, based on the device information and the second received from the second device, execution of proxy processing.

5. The electronic device according to claim 4, wherein the circuitry is further configured to manage request contents of the second request received from the second device.

6. The electronic device according to claim 1, wherein
the device information includes functional information of each device of the plurality of devices, and
the functional information includes information of a list of functions for proxy processing.

7. The electronic device according to claim 6, wherein the list of functions of the first device varies dynamically based on a processing load of the first device.

8. The electronic device according to claim 1, wherein the circuitry is further configured to image a specific monitoring range to acquire image data, and
the surrounding information includes the acquired image data.

9. The electronic device according to claim 1, further comprising a sensor configured to measure at least one of sound, temperature, humidity, pressure, acceleration, magnetism, or an amount of radiation, to acquire sensor information, wherein
the surrounding information includes the acquired sensor information.

10. A processing proxy requesting method of an electronic device, comprising:
acquiring surrounding information;
detecting a specific event based on the acquired surrounding information;
determining, based on the detection of the specific event, a function for processing the surrounding information is absent in the electronic device;
selecting, based on device information related to a plurality of devices connected through a network and the determination the function for the processing the surrounding information is absent in the electronic device, a device including the function from the plurality of devices, wherein
the plurality of devices includes the electronic device, and
the selected device is different from the electronic device; and
transmitting, to the selected device through the network, giving a request for proxy of the processing of the surrounding information.

11. An information processing system, comprising:
a plurality of electronic devices connected through a network, wherein a first electronic device of the plurality of electronic devices includes circuitry configured to:
manage device information related to the plurality of electronic devices;
acquire surrounding information;
detect a specific event based on the acquired surrounding information;
determine, based on the detection of the specific event, a function for a process of the surrounding information is absent in the first electronic device itself;
select, based on the device information and the determination the function for the process of the surrounding information is absent in the first electronic device, a second electronic device including the function from the plurality of electronic devices, wherein the second electronic device is different from the first electronic device; and
transmit, to the second electronic device through the network, a request for proxy of the process of the surrounding information.

* * * * *